UNITED STATES PATENT OFFICE.

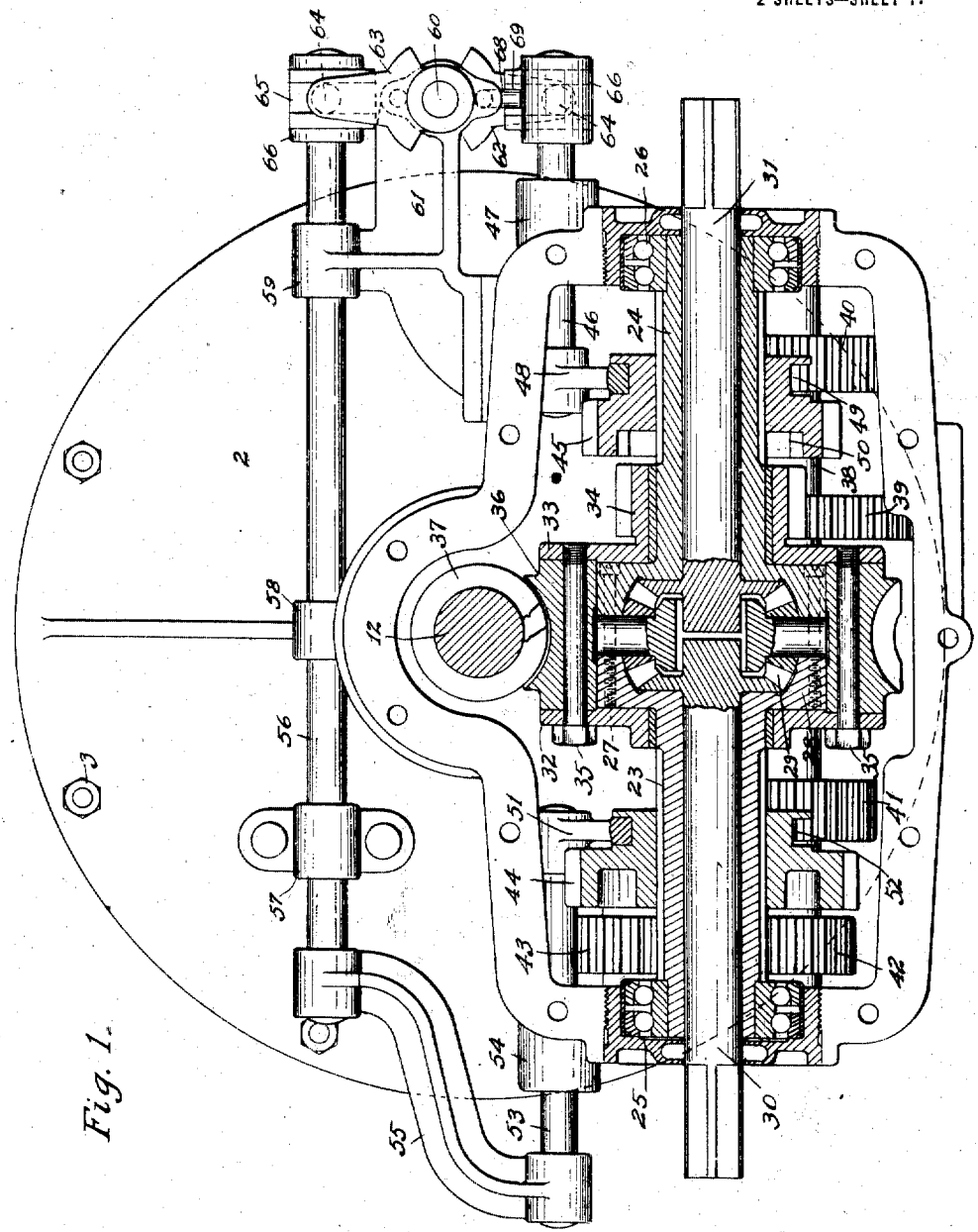

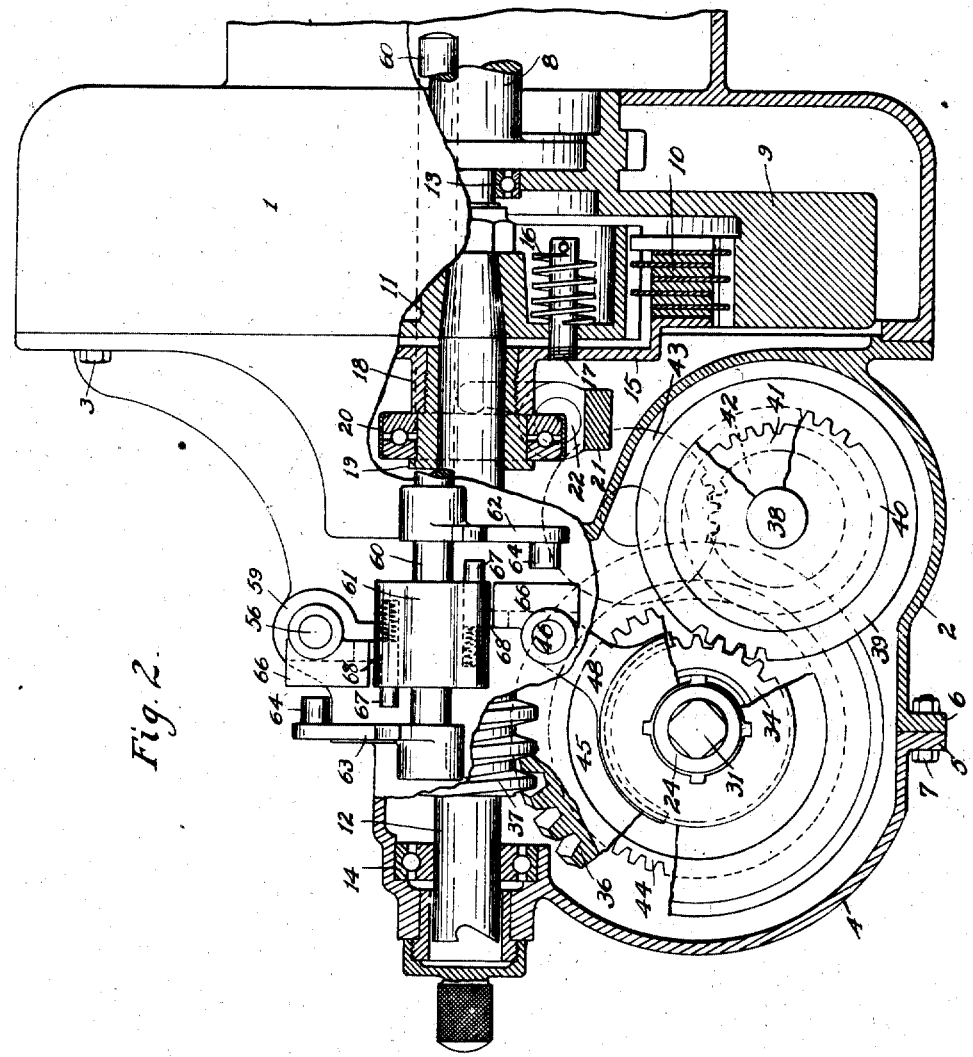

CARL H. BLOMSTROM AND LOWELL C. BLOMSTROM, OF DETROIT, MICHIGAN.

POWER-TRANSMISSION MECHANISM.

1,225,307.  Specification of Letters Patent.  Patented May 8, 1917.

Application filed January 8, 1916. Serial No. 70,900.

*To all whom it may concern:*

Be it known that we, CARL H. BLOMSTROM and LOWELL C. BLOMSTROM, citizens of the United States of America, residing at Detroit, in the county of Wayne and State of Michigan, have invented certain new and useful Improvements in Power-Transmission Mechanisms, of which the following is a specification.

This invention relates to power transmission mechanism especially adapted for driving motor vehicles, and it consists in the novel features of construction and association of parts as hereinafter set forth and claimed.

The invention has for its object the provision of simple and improved means for transmitting and applying the power of the engine for driving motor vehicles, wherein the general construction is such as to reduce to a minimum the number of operative parts essential to efficiency and to enable the assembling and combining of the several power units consisting of clutch mechanism, transmission, change speed and differential gearing, together with the engine in a compact group within a single inclosing case, and wherein the arrangement is such that the master gear of the differential is utilized for establishing the driving connection between the main power shaft and the counter-shaft of the change speed gears through which the power is transmitted at variable speeds to the shaft sections of the differential, and also for effecting a direct driving connection between the differential shafts and said main shaft, whereby said master gear is constantly driven at a fixed ratio with the speed of the engine irrespective of the reductions in speed at which the power is transmitted through the differential shafts to move the load. In this way the master gear is caused to float when idle and is therefore always under motion when receiving the load, thus tooth strain and frictional resistance upon this gear, which normally is subjected to the heaviest direct driving strain, is materially reduced and greater efficiency in the transmission of the power is attained.

In the accompanying drawings is shown a preferred form of embodiment of the essential features of the present invention, and in which, Figure 1 is a vertical sectional front end elevation of the engine casing showing the transmission and differential gearing arranged in driving engagement with the power shaft of the engine within a gear case extension on the engine casing.

Fig. 2 is a vertical sectional side elevation of the front portion of the engine casing and gear case containing the differential and transmission gearing having portions of the casing and gears broken away to show the relative arrangement of parts.

Referring to the parts of the mechanism by the characters of reference on the several views of the drawings, 1 designates the engine casing and 2 a gear case extension which is preferably detachably secured to the end of the engine casing containing the fly wheel by bolts as at 3. The forward end of the gear case 2 is provided with a detachable closure or cap 4 having a flange 5 secured to a flange 6 on said case by bolts 7 as shown in Fig. 2. Mounted on the end of the crank-shaft 8 of the engine within the casing 1 is the fly wheel 9, and contained within the body of the fly wheel is a common form of disk clutch 10, the driven member 11 of which is rigidly mounted on a shaft section 12, constituting the main driving shaft, and which is journaled in axial alinement with the crank shaft 8 to rotate at its inner end in a bearing 13 mounted in the hub of the fly wheel 9 and at its outer end in a bearing 14 mounted in the cap 4 of the gear case 2. The thrust plate 15 of the clutch which establishes the driving engagement between the fly wheel and the main or driven shaft 12, is normally held engaged with the disks of the clutch under the tension of coiled springs 16 which bear against the member 11 and are confined upon studs 17 anchored in the thrust plate 15 and slidably extended through said member.

A collar 18 formed on the plate 15 receives a screw-threaded shouldered bushing 19 which slidably embraces the shaft 12 and rotatably carries between its shoulder and said collar a thrust bearing ring 20. Bearing against the inner face of said ring is a clutch yoke 21 carried on a shaft 22 which is journaled in the casing 2, and which is adapted for connection in the usual way with a suitable foot lever or pedal, by means of which said yoke may be swung against the bearing ring to withdraw the thrust plate and release the clutch, as will be readily understood by reference to Fig. 2.

Positioned within the forward end of the casing 2, at right-angles to and beneath the main shaft 12, are two axially alined sleeve sections 23 and 24 which are journaled at opposite ends in bearings 25 and 26, respectively, mounted in opposite walls of said casing. The inner ends of these sleeves are provided with enlarged hollow meeting flanges secured together by bolts as at 27 to form a housing 28 within which is contained a common form of differential gearing 29 connecting the inner ends of shaft sections 30 and 31 which are journaled, respectively, in the sleeves 23 and 24; said shaft sections extending at their outer ends through the walls of the casing 2 are adapted for connection with suitable shafts for distributing and applying the power to the wheels to be driven.

Rotatably embracing the sleeves 23 and 24 upon opposite sides of the differential housing 28 are flanged collars 32 and 33, respectively, the latter of which is provided at its hub with a pinion gear 34, and rotatably embracing this housing and confined between said collars by bolts as at 35, is a worm gear ring 36 which meshes with a worm pinion 37 fixed upon the main shaft 12. This ring, which forms the main or master gear of the differential upon the sleeve of which it normally floats or runs idle, is constantly driven through the worm at a reduction of speed to that of the main shaft and serves to transmit motion from said shaft to a counter-shaft 38, which shaft is suitably journaled to rotate in adjacent parallel relation to the sleeves of the differential in bearings in the casing 2, and carries a gear 30 in mesh with the pinion 34 through which said counter-shaft is continuously driven at a reduced speed to that of said master gear.

Fixed upon this counter-shaft is a series of change speed gears 40, 41 and 42 of different sizes and meshing with the gear 42 is a reversing gear 43 which is journaled in the usual way upon a stud anchored in the casing 2. Driving connections for transmitting motion through these gears from the counter-shaft to the differential shaft sections 30 and 31 at variable speeds and in forward and reverse directions, and for establishing a direct driving engagement with these shafts through the master gear, are effected by means of a pair of sliding gears 44 and 45 which are splined to rotate with and to slide upon the sleeves 23 and 24, respectively, of the differential housing. The sliding gear 45 is actuated by a shift rod 46 fitted to slide through a bearing 47 on the casing 2 and carries at its inner end a yoke arm 48 which is received in a peripheral groove 49 formed in the hub upon one side of said gear, in the opposite face of which is formed an internal gear or series of teeth 50 adapted to register and interlock with the teeth of the pinion 34 in the manner of a clutch, whereby through the sliding movement of the rod 46 said gear may be shifted in one direction to engage the clutch and establish a direct driving connection through the master gear and sleeve of the differential with the main shaft and the differential shafts, and in the opposite direction to release the clutch and mesh said sliding gear with the gear 40 of the counter-shaft through which the power will be transmitted to said differential shafts at a reduced speed.

The sliding gear 44, which is adapted to be shifted to mesh with the gear 41, of the counter-shaft for transmitting the power at low speed to the differential shafts, and with the gear 43 for reversing the direction of the drive of said shafts, is actuated by a yoke arm 51 which freely engages in a peripheral groove 52 formed in the hub of said gear and is fixed upon the end of a push rod 53 which is supported to slide through a bearing 54 on the casing 2. The outer end of this rod is connected by an arm 55 with the end of a connecting push rod 56 which extends parallel with the rod 53 through bearings 57, 58 and 59 on the casing 2 and terminates in line with the outer end of the push rod 46. These push rods are actuated to provide a selective control for shifting the sliding gears by means of a control rod 60 mounted to rotate and to slide at right angles to the push rods 46 and 56 in a bearing bracket 61 secured to the casing 2 between the ends of said rods, and which has fixed thereon upon opposite sides of said bracket reversely opposed crank arms 62 and 63, each carrying a pin or stud 64 adapted for respective engagement alternately with a slot 65 formed vertically in the meeting face of a head 66 secured to the outer end of each of said rods. The studs of the crank arms are normally disengaged with the slots of the respective heads of the push rods 46 and 56 and these rods are normally held against longitudinal movement to retain their respective sliding gears at neutral or out of driving engagement, by means of right angled latch bolts 67 which are seated in bores to project at one end each from opposite faces of the bracket 61 in proximity to the inner face of the adjacent crank-arm with which they are adapted to engage and to extend at their opposite laterally projecting ends 68 into slots 69 formed in the back faces of the respective heads of said push rods and in which said bolts are normally held to lock the rods and to recede under the tension of coiled springs, as indicated at 70 in Fig. 2.

By this arrangement as the control rod is moved longitudinally in either direction to establish an operative connection with either of the push rods 46 and 56, through the engagement of the stud of the crank arm with the head of the push rod, said arm will be caused to engage and force the latch bolt to recede from locked engagement with said head simultaneously with the entrance of its stud into the slot of said head, thus releasing the push rod and effecting a pivotal connection with the crank arm, which, through a swinging movement imparted thereto by rocking the control rod, will transmit longitudinal movement to the push rod thus selected, and actuate said rod in either direction to shift its respective sliding gear into or out of driving engagement.

It should be understood that any other suitable means may be employed for selectively shifting the sliding gears as is common practice. The novel and essential features of the present invention reside in the construction and arrangement of parts by which the coöperative power transmitting units are grouped and compactly combined with the engine in a manner to utilize the master gear of the differential unit as the transmitting gear through which the power of the engine is transmitted directly at high speed and indirectly at lower speeds to the differential or driven shafts.

We claim:—

1. In a power transmission mechanism, a casing, a main shaft adapted for driving engagement with an engine, a pinion thereon, a sleeve journaled in said casing and having an enlarged portion forming a gear housing, shaft sections journaled in said sleeve, differential gearing inclosed by said housing and connected in driving engagement with said shaft sections, a gear ring embracing and bearing circumferentially on said enlarged portion of said housing and meshing with the pinion of said main shaft, and clutch mechanism operably carried on said sleeve and coöperating with said gear ring for establishing a direct driving connection between said main shaft and said shaft sections through said differential gearing.

2. In a power transmission mechanism, a casing, a main shaft adapted for driving engagement with an engine, a pinion thereon, a sleeve journaled in said casing and having an enlarged portion forming a gear housing, shaft sections journaled in said sleeve, differential gearing inclosed by said housing and connected in driving engagement with said shaft sections, a gear ring embracing and bearing circumferentially on said enlarged portion of said housing and overlapping the sides of the same, said gear ring meshing with the pinion gear of said main shaft, and clutch mechanism operably carried on said sleeve and coöperating with said gear ring for establishing a direct driving connection between said main shaft and said shaft sections through said differential gearing.

3. In a power transmission mechanism, a casing, a main shaft adapted for driving engagement with an engine and a pinion carried thereon, a sleeve journaled in said casing and forming a gear housing, shaft sections journaled in said sleeve, differential gearing in said housing and connected in driving engagement with said shaft sections, a countershaft journaled in said casing, transmitting gears of varying sizes carried thereby, a gear ring rotatably embracing said housing and in driving engagement with said pinion, a pinion thereon in mesh with a gear of said countershaft, and a slidable gear mounted on said sleeve and operatively arranged for locking engagement with the pinion of said gear ring and for direct engagement with a gear of said countershaft for transmitting motion either directly from said gear ring or through said countershaft to said shaft sections.

4. In a power transmission mechanism, a casing, a main shaft adapted for driving engagement with an engine and a pinion carried thereon, a sleeve journaled in said casing and forming a gear housing, shaft sections journaled in said sleeve, differential gearing mounted in said housing and connected in driving engagement with said shaft sections, a countershaft journaled in said housing, transmitting gears of varying sizes, on said counter shaft, a gear ring rotatably embracing said housing and overlapping the sides of the same, said gear ring being in driving engagement with said pinion, a pinion thereon in mesh with a gear of said countershaft, and a slidable gear mounted on said sleeve and operatively arranged for locking engagement with the pinion of said gear ring and for direct engagement with a gear of said countershaft for transmitting motion either directly from said gear ring or through said countershaft to said shaft sections.

5. In a power transmission mechanism, a main shaft adapted for driving engagement with an engine and a pinion carried thereon, a sleeve structure, shaft sections journaled in said sleeve structure, differential gearing carried by said sleeve structure and connected in driving engagement with said shaft sections, a countershaft, transmitting gears of various sizes on said countershaft, a gear ring in mesh with said pinion and a pinion thereon in mesh with a gear on said countershaft, a slidable gear mounted on said sleeve structure and movable into and out of engagement with a gear on said countershaft for transmitting motion from said gear ring through said countershaft to said shaft sections.

6. In a power transmission mechanism, a main shaft adapted for releasable driving connection with an engine and a pinion carried thereon, a sleeve structure, shaft sections journaled in said sleeve structure, differential gearing carried by said sleeve structure and connected in driving engagement with said shaft sections, a countershaft, transmission gears of varying sizes, on said countershaft, a gear ring in mesh with the pinion of said main shaft and a pinion thereon in mesh with a gear on said countershaft, and a slidable gear on said sleeve structure movable in one direction for driving engagement with a gear on said countershaft and having teeth for interlocking engagement with teeth on said pinion of said gear ring through movement in the opposite direction.

7. In a power transmission mechanism, a main shaft adapted for disengageable driving connection with an engine, a pinion on said main shaft, a sleeve structure, shaft sections journaled in said sleeve structure, differential gearing carried by said sleeve structure and connected in driving engagement with said shaft sections, a countershaft, transmission gears of varying sizes on said countershaft, a main gear rotatably mounted on said sleeve structure and in mesh with the pinion of said main shaft, a pinion carried by said main gear in mesh with a gear on said countershaft, a clutch gear slidably mounted on said sleeve structure and movable in one direction for driving engagement with a gear on said countershaft and in the opposite direction for interlocking engagement with said main gear.

8. The combination of a main driving shaft and a pinion thereon, a carrying structure, shaft sections carried by said structure, differential gearing also carried by said structure and connected in driving engagement with said shaft sections, a countershaft, transmitting gears on said countershaft, a master gear for the differential gearing rotatably mounted in driving engagement with the pinion on the main shaft and with a gear on said countershaft, and a slidable gear operatively connected to said structure and movable into and out of engagement with a gear on said countershaft and into and out of driving connection with said master gear.

9. In power transmission mechanism for motor vehicles, the combination of a shaft, a main gear driven therefrom, wheel-driving shaft sections, differential gearing connected in driving engagement with said shaft sections, a countershaft, speed-varying gearing on said countershaft, a sliding gear rotating at the same speed as said differential gearing and in driving connection therewith, and means for rotating said sliding gear from the main gear through the speed-varying countershaft gearing.

10. In power transmission mechanism for motor vehicles, the combination of a shaft, a main gear driven therefrom, wheel-driving shaft sections, differential gearing connected in driving engagement with said shaft sections, a countershaft, speed-varying gearing on said shaft, a sliding gear rotating at the same speed as said differential gearing and in driving connection therewith, said sliding gear being adapted to be driven either directly from the main gear or through the medium of the speed-varying countershaft gearing.

11. In a power transmitting mechanism for motor vehicles, the combination of a driving shaft, differential gearing, a housing therefor, a master gear rotatably mounted thereon and in engagement with said driving shaft, wheel driving shaft sections operatively connected through said differential gearing with said gear housing, and speed varying gearing engageable with said master gear and with said housing for establishing driving connection between said driving shaft and said shaft sections.

In testimony whereof, we have signed this specification.

CARL H. BLOMSTROM.
LOWELL C. BLOMSTROM.